United States Patent [19]

Roderick

[11] Patent Number: 5,104,525

[45] Date of Patent: Apr. 14, 1992

[54] PORTABLE SELF-CONTAINED WATER REMEDIATION PACKAGE

[76] Inventor: James R. Roderick, Rte. 1, Box 108, Coweta, Okla. 74429

[21] Appl. No.: 698,790

[22] Filed: May 13, 1991

[51] Int. Cl.$^5$ .................. B01D 19/00; B01D 17/12
[52] U.S. Cl. .................. 210/87; 55/196; 55/356; 210/188; 210/241; 210/320
[58] Field of Search .............. 55/53, 196, 356; 202/83; 210/188, 85, 87, 241, 258, 259, 261, 294, 320

[56] References Cited

U.S. PATENT DOCUMENTS

| | | | |
|---|---|---|---|
| 4,021,402 | 5/1977 | Clem | 260/42.12 |
| 4,084,382 | 4/1978 | Clem | 61/36 R |
| 4,576,572 | 3/1986 | Mueller et al. | 432/13 |
| 4,611,950 | 9/1986 | Russomano | 405/128 |
| 4,648,332 | 3/1987 | Goedhart | 110/346 |
| 4,667,609 | 5/1987 | Hardison et al. | 110/236 |
| 4,700,638 | 10/1987 | Przewalski | 110/346 |
| 4,715,965 | 12/1987 | Sigerson et al. | 210/800 |
| 4,746,439 | 5/1988 | Newman | 210/688 |
| 4,764,272 | 8/1988 | Fox, Sr. | 210/188 |
| 4,782,625 | 11/1988 | Gerken et al. | 47/1.42 |
| 4,787,323 | 11/1988 | Beer et al. | 110/346 |
| 4,801,384 | 1/1989 | Steiner | 210/634 |
| 4,809,790 | 3/1989 | Manchak, Jr. | 175/17 |
| 4,832,122 | 5/1989 | Corey et al. | 166/266 |
| 4,834,194 | 5/1989 | Manchak, Jr. | 175/50 |
| 4,841,998 | 6/1989 | Bruya | 134/10 |
| 4,842,448 | 6/1989 | Koener et al. | 405/258 |
| 4,844,795 | 7/1989 | Halwani | 210/188 |
| 4,846,934 | 7/1989 | Carberry | 210/170 |
| 4,849,360 | 7/1989 | Norris et al. | 435/264 |
| 4,850,745 | 7/1989 | Hater et al. | 405/258 |
| 4,882,021 | 11/1989 | Barnhart | 204/157.15 |
| 4,892,664 | 1/1990 | Miller | 55/196 |
| 4,895,085 | 1/1990 | Chips | 110/346 |
| 4,906,302 | 4/1989 | Druya | 134/10 |
| 4,913,586 | 4/1990 | Gabbita | 405/129 |
| 4,919,570 | 4/1990 | Payne | 405/128 |
| 4,925,552 | 5/1990 | Bateson et al. | 210/241 |
| 4,979,886 | 12/1990 | Rippberger | 55/196 |

Primary Examiner—Robert A. Dawson
Assistant Examiner—Joseph Drodge
Attorney, Agent, or Firm—Head and Johnson

[57] ABSTRACT

A portable self-contained water remediation unit having a generally rectangular structural housing dimensioned for ease of transporation from one location to another, a vessel mounted within the housing structure having a vertical baffle dividing the vessel into an inlet chamber and an outlet chamber with communication in the lower portion of the baffle between the chambers, a vertical stripper column having a lower portion and a severable upper portion, the lower portion being received within the structural housing and the upper portion being removably attachable in vertical alignment with the lower portion, the upper portion having a water inlet and the lower portion having a water outlet and the lower portion having an air inlet, the upper portion having an opening in the upper end thereof adaptable to receive a removable exhaust tower, packing positioned within the strippper column upper section down through which water trickles and an air pump mounted within the structural housing for forcing air into the stripper column bottom portion and upwardly through the packing to contact water passing downwardly through the packing to separate volatile contaminants from the water, which volatile contaminants are carried out of the upper end of the stripper column upper portion, clean water being drawn from the stripper tower lower portion.

5 Claims, 4 Drawing Sheets

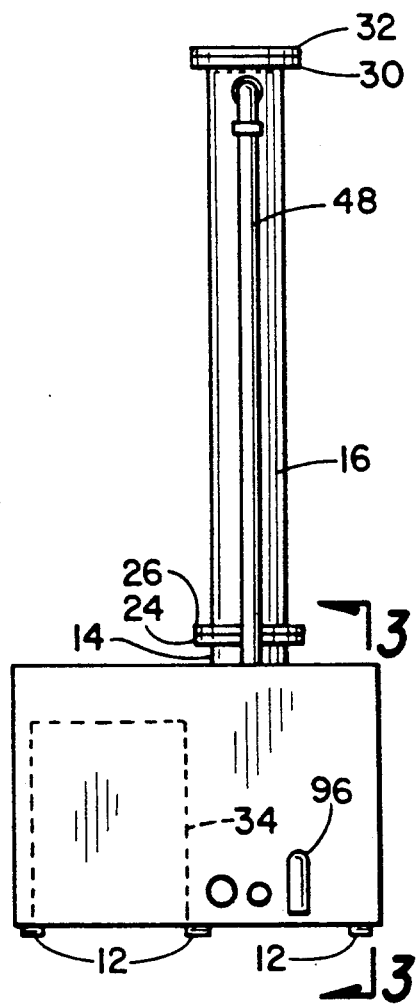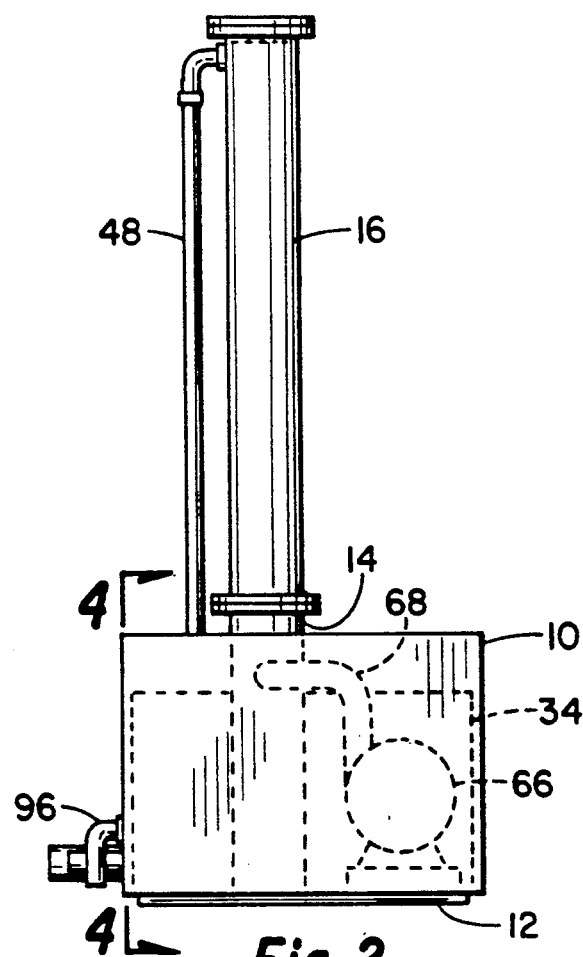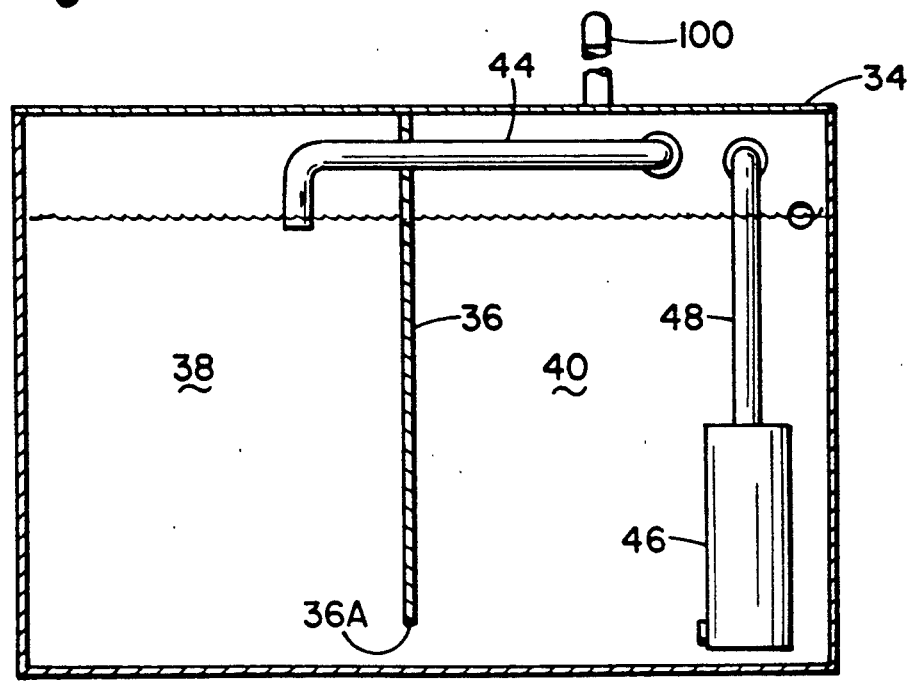

PORTABLE SELF-CONTAINED WATER REMEDIATION PACKAGE

SUMMARY OF THE INVENTION

This disclosure is for a water remediation unit that is of a compact easily portable configuration. In practical application of the invention, the unit can be approximately four feet wide, four feet high and five feet deep.

The portable unit has an oil/water separator, a sediment-tank, a water meter, an electrical meter, a magnehelic air gauge, a high liquid level cut-off and sample ports on the containment inlet and treated fluid conduits. The unit is all pre-wired, pre-plumed and mounted with an insulation secured housing.

The unit can be used for ground water recovery or, when needed, a soil vapor extraction unit can be added which consists of an additional blower unit mounted on the carrier directly above the blower used for ground water recovery.

Telemetry may be utilized as a portion of the apparatus. Sensors may be added to the unit that allow for remote computer monitoring.

The unit is designed for convenience in operation and installation. The oil/water separator with a sediment tank is mounted on a compact skid with an air stripper, blower and all of the necessary sampling ports, meters and gauges needed for accurate record keeping and operation of the unit. The unit also has the capability for adding a soil vent pump and related components. The air stripper base includes a submersible pump for above elevational discharge and/or use with carbon polishing canisters.

The unit includes a stripper tower that is sectional for ease of transportation and set up. All pumping and related equipment requiring maintenance or eventual removal and/or replacement are installed with unions and junction boxes with large access doors for ease of entry and equipment removal. In the practice of the invention, it is preferred that the piping be color coded for quick identification and tracing for sampling. The total enclosure is insulated with a high density fiberglass board, and in the preferred embodiment is equipped with a thermostatically controlled interior heater and heat taped tower riser.

The tower base and separator are equipped with high level cut-off controls for the feed pump in the event of internal pump failure. The unit is designed for operational telemetry monitoring and/or auto dialing in the event of a power failure.

The complete unit is, in one embodiment, a four foot wide by four foot high and five foot long steel enclosed box with three separate access panels on the sides and one access panel on the top, all keyed alike. The tower height varies, as does the diameter, depending on the type and concentration of contamination to be treated. All of the towers have eyelets at the top for securing with guide wires.

The portable self-contained water remediation unit includes a generally rectangular structural housing dimensioned for ease of transportation from one location to another. A vessel is mounted within the structural housing. The vessel has a vertical baffle therein dividing the vessel into an inlet chamber and an outlet chamber. The baffle has a passageway in the lower portion for the passage of water from the inlet chamber to the outlet chamber. This passageway may be in the form of the baffle being less than the full height of the vessel so that the lower edge of the baffle is spaced above the vessel floor. The vessel has a water inlet communicating with the inlet chamber, and an outlet opening communicating with the outlet chamber.

An elongated vertical stripper column is employed. The stripper column has a lower portion and a severable upper portion. The lower portion is received within the structural housing. The upper portion is removably attached in vertical alignment with the lower portion. The upper stripper column portion is demountable for ease of transportation of the structural housing from one location to another.

The upper portion of the stripper column has a water inlet, and the lower portion has a water outlet and an air inlet. The upper portion of the stripper column has an opening in the upper end thereof adaptable to receive a removable vertically extending exhaust tower.

Packing is placed within the stripper column upper portion. Contaminated water introduced into the upper end of the stripper column upper portion trickles down through the packing.

An air pump is mounted within the structural housing. The air pump is connected for forcing air into the stripper column bottom portion. The air passes upwardly through the packing to contact water trickling downwardly through the packing to expose volatile contaminants within the water to the upwardly moving column of air. The volatile contaminants are separated and carried out of the upper end of the stripper column upper portion. Clean water is drawn from the stripper tower lower portion. The clean water can then be safely discharged to the environment.

In the preferred arrangement, a water pump is mounted within the structural housing for moving water from the vessel outlet chamber to the stripper column water inlet.

For information relating to the subject matter of this disclosure, reference may be had to the following previously issued U.S. patents: U.S. Pat. Nos. 4,846,934; 4,782,625; 4,746,439; 4,895,085; 4,919,570; 4,021,402; 4,084,382; 4,576,572; 4,611,950; 4,648,332; 4,667,609; 4,700,638; 4,715,965; 4,787,323; 4,801,384; 4,809,790; 4,832,122; 4,834,194; 4,841,998; 4,842,448; 4,849,360; 4,850,745; 4,882,021; 4,906,302; and 4,913,586.

A better understanding of the invention will be had by references to the following description and claims, taken in conjunction with the attached drawings.

DESCRIPTION OF THE DRAWINGS

FIG. 1 is an elevational side view of the portable self-contained water remediation unit of this disclosure with the upper portion of the stripper tower attached but without a exhaust tower affixed to the upper portion.

FIG. 2 is an elevational side view of the portable self-contained water remediation unit of FIG. 1.

FIG. 5 is a cross-sectional view of the containment vessel as used in the unit as taken along the line 5—5 of FIG. 4.

DESCRIPTION OF THE PREFERRED EMBODIMENTS

Figure 3:
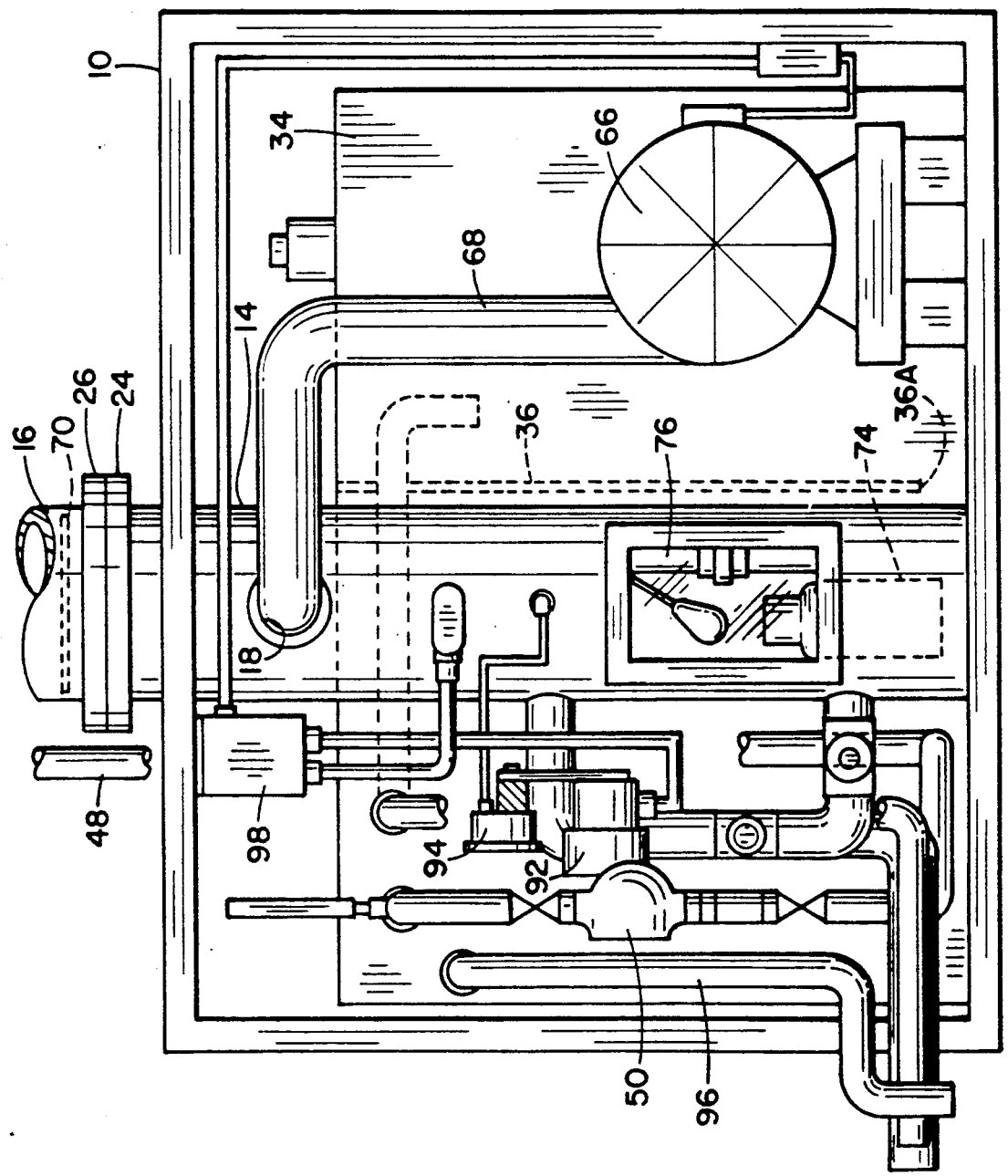
FIG. 3 is an enlarged cross-sectional view taken along the line 3—3 of FIG. 1 showing in elevation the interior arrangement of the structure, with the upper portion of the stripper tower shown fragmentarily.

Referring to the drawings and first to FIGS. 1 and 2, external views of the portable self-contained water remediation unit according to the principles of this invention are shown. The unit is formed of a generally rectangular structural housing 10 that is dimensioned for ease of transportation from one location to another. As an example, in practicing the invention, housing 10 may be of approximately four feet by four feet by five feet, although the dimensions may vary considerably according to the specific arrangement of the unit while keeping with the principles of this disclosure.

The housing 10 has structural members 12 on which it rests and which facilitates movement of the unit from one location to another.

An important element of the unit, as will be described subsequently, is a stripper column. A unique feature of the unit of this disclosure is the provision wherein the stripper column is formed of a lower section 14 and a severable upper section 16. The stripper column is arranged so that upper portion 16 can be easily and expeditiously removed to facilitate transportation of the unit from one location to another. It can be seen that with upper portion 16 of the stripper column removed, the unit is a compact package easily and economically transportable to a location where the reconditioning of contaminated water is required.

Figure 6:
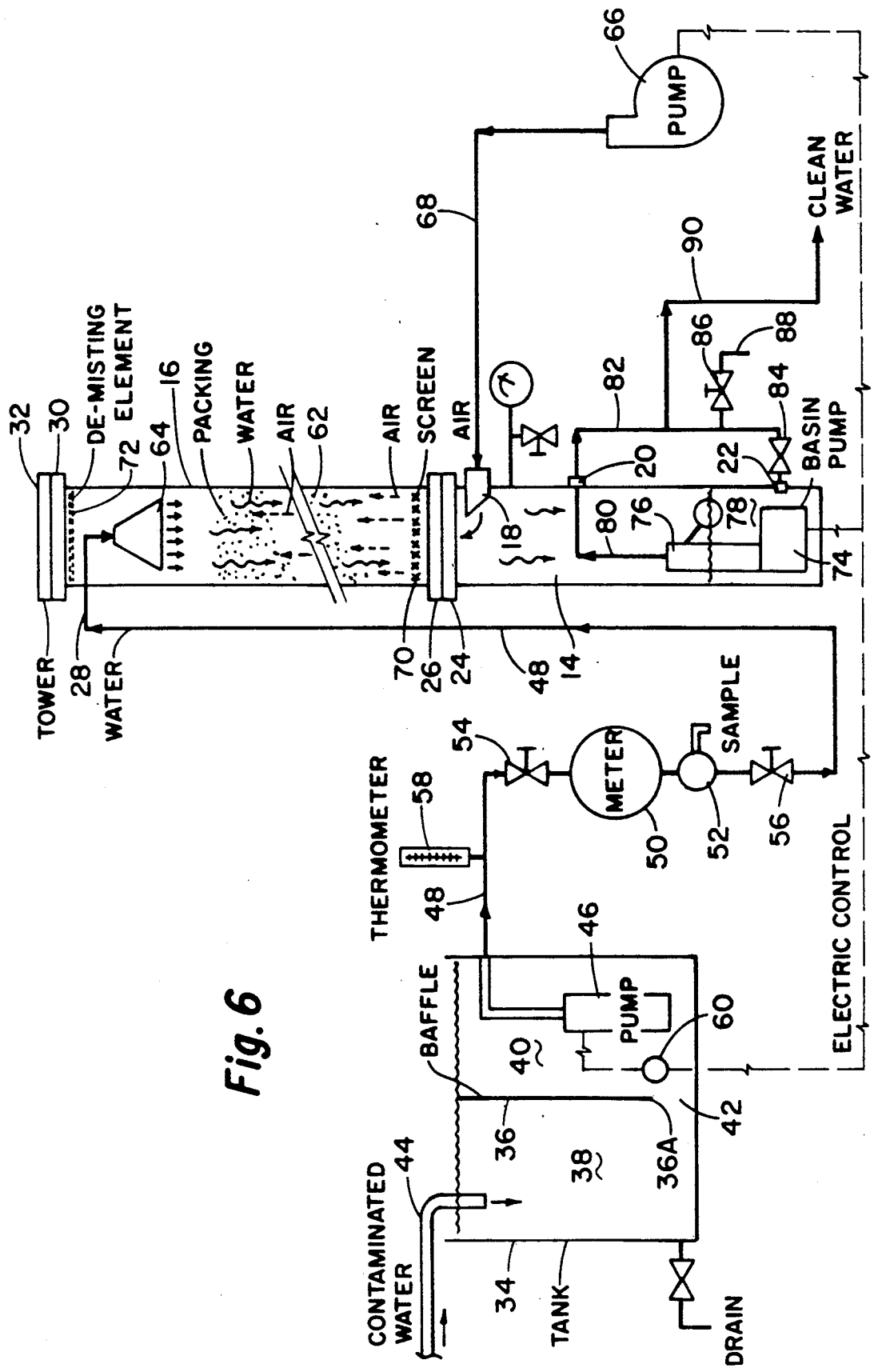
FIG. 6 is a flow diagram of the system making up the water remediation unit showing most of the basic components and the arrangement of piping of the interconnection of the components.

Referring now to FIG. 6, a flow chart showing the basic components making up the system contained within the structural housing 10 is shown. The stripper column lower portion 14 has an air inlet 18 in the upper portion thereof, and a first water outlet 20 and a second water outlet 22. The upper end of the stripper column lower portion has a flange 24.

Mounted on the stripper column lower portion in axial vertical alignment is the stripper column upper section 16 that has a flange 26 at its lower end. The stripper column upper portion 16 can be easily severed from the lower portion 14 by removing bolts (not shown) that connect flanges 24 and 26. In this way the stripper column upper portion can be removed so that the remaining components of the unit are in a compact ease to handle structural housing 10, as shown in FIGS. 1 and 2.

The stripper column upper section 16 has a water inlet 28 adjacent the upper end thereof. The upper end includes a flange 30 having a mating flange 32. Although not shown in the drawings, mating flange 32 can, when required according to the specific environment in which the unit is used, be a removable exhaust tower. The exhaust tower can be of a length required to exhaust air passing upward through the stripping tower to the environment. By removing bolts (not shown) flanges 30 and 32 may be disconnected so that the exhaust tower can be removed from the stripper column and easily reattached when necessary.

Contained within the unit is a vessel or tank 34. The vessel has a baffle 36 therein dividing the interior of the vessel into an inlet portion 38 and an outlet portion 40. Communication is provided in the lower portion of the vessel between the inlet and outlet portions 38 and 40, and this can be achieved by the use of a baffle having a lower edge 36A that is spaced above the bottom of the vessel providing a passageway 42 between the inlet and outlet portions of the vessel.

Contaminated water to be treated by the unit enters the unit by a conduit 44 and flows into inlet portion 38 of vessel 34. Solid contaminates can settle from the incoming water in inlet chamber 38 and the water then migrates to outlet portion 40. By means of a pump 46, water is passed out of the outlet portion 40 through a conduit 48 to flow into water inlet 28 of stripper column upper section 16. Any lighter contaminants, such as oil, are collected in the top of the tank.

In series with conduit 48 are various elements: a meter 50 by which the volume flow is measured; a sample port 52 is provided so that a sample of the water flowing out of the vessel can be made; valves 54 and 56 to control the passage of water from vessel 34 to stripper columns 14, 16. The temperature of the water flowing in conduit 48 is measured by thermometer 58. Thus, the unit includes the components necessary for carefully monitoring water passing through the unit at all stages to make sure that the unit functions properly to recondition the water.

The flow of water level from the vessel outlet portion 40 is controlled by means of an electric control element 60 that turns "on" and "off" pump 46 as required to maintain the desired water level in the vessel and the desired rate of flow through the system.

Positioned within the stripper column upper section 16 is packing 62 that causes the water to disperse and trickle downwardly through the packing. To further disperse the water within the column a distribution head 64 is employed.

An electrically driven air pump 66 conveys air under pressure through conduit 68 to air inlet 18 in the upper portion in the stripper column lower section 14. The air passing into the stripper column passes upwardly through packing 62 and out the upper opened end of the stripper column upper section 16 through flange 30. When an exhaust tower, as exemplified by flange 32, is employed the air passes through the exhaust tower and out of the upper end thereof into the atmosphere.

A screen 70 in the lower portion of the stripper column upper section 16 retains packing 62 in position and prevents the packing from falling downwardly into the stripper column lower section. In addition, a demisting element 72 serves to condense water vapor remaining in the air passing upwardly therethrough so that the air passing out of the stripper column is essentially free of water.

A basin pump 74 is positioned within lower portion 14 of the stripper column. By means of a liquid level detector 76, pump 74 is controlled to regulate the level of water 78 in the lower portion of the stripper column 14. By means of a conduit 80 extending from basin pump 74, water is pumped through outlet 20 to conduit 82 where the clean water is then free to be discharged to the environment, such as into a water drainage system. Conduit 82 also connects to a valve 84 and back to second water outlet 22 so as to permit, when valve 84 is open, the water to recycle. By means of a valve 86 samples of water can be taken at 88 to provide means of ensuring that the water is of quality required for discharge to the environment. The conduit 90 extends from outlet conduit 82 to the clean water discharge.

Referring to FIGS. 1 through 4, the structural arrangement of most of the components as shown in flow diagram FIG. 6, as arranged in the structural housing 10 of the unit, are illustrated, it being understood that the structural arrangement is by way of example only and that the actual physical placement of various components may vary considerably without departing from the spirit and scope of this disclosure.

Figure 4:
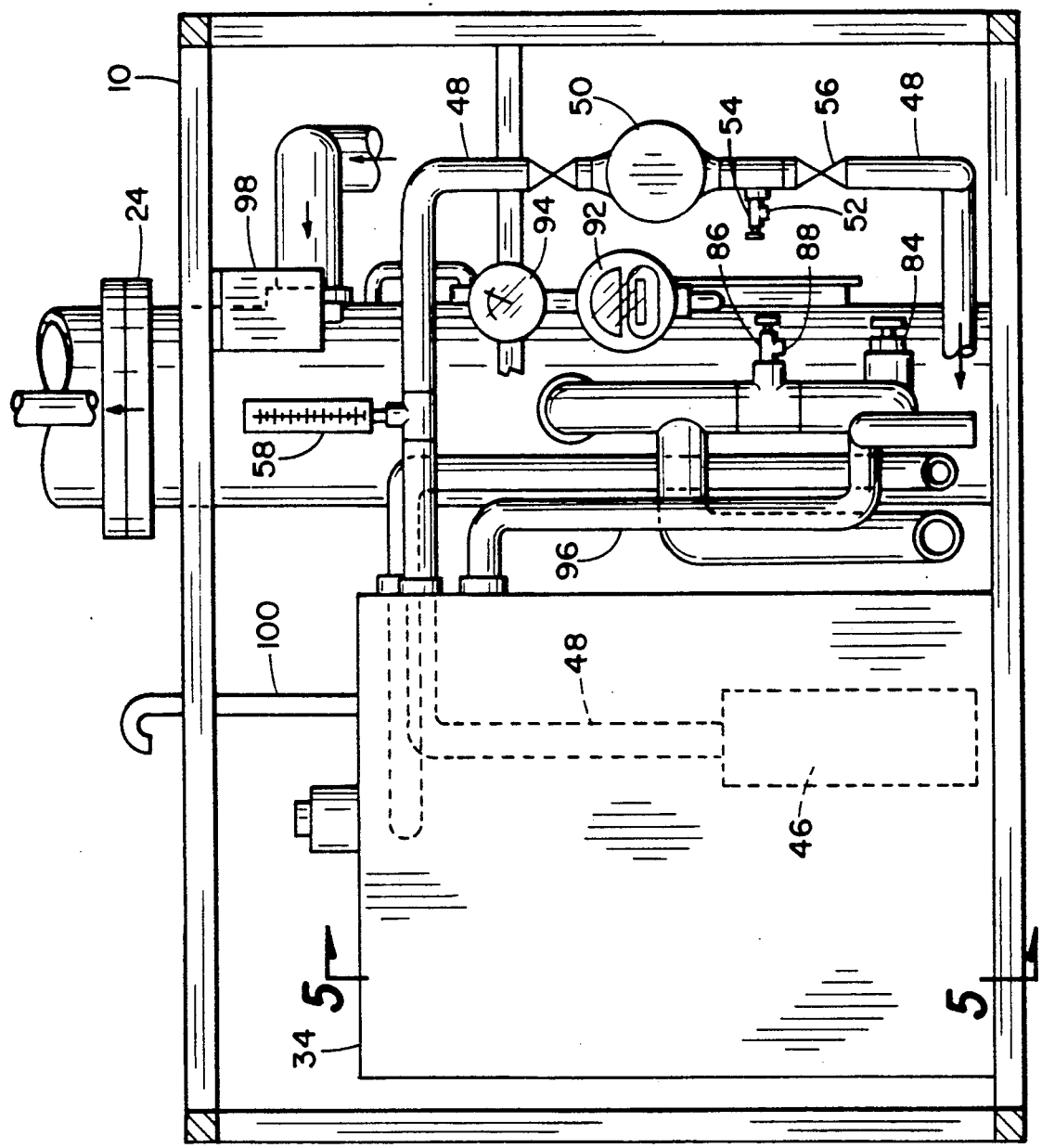
FIG. 4 is an enlarged elevational cross-sectional view taken along the line 4—4 of FIG. 2 showing more details of the arrangement of the components making up the portable self-contained water remediation unit.

FIGS. 3 and 4 illustrate some elements that are required in practicing the concept of this invention that are not illustrated in the flow diagram of FIG. 6, such as an electric meter 92 by which the total energy consumption of the system can be measured, a magnehelic air gauge 94, a drain piping 96 connected to vessel 34, electric motor control panels 98, and so forth, which are typically employed in interconnecting equipment utilized in a process. A vent pipe 100 equalizes air pressure within vessel 34.

Other elements are illustrated and are not specifically identified as exemplary of the preferred method of practicing the invention.

The concept of the invention is to provide a highly compact, self-contained easily portable system which can be moved from one location to another to remediate water that has been contaminated. The system is particularly useful for treating water that has been contaminated such as by volatile chemical or fuel spills. Further, the system is particularly applicable for use in systems where not only water but also soil is remediated.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A portable self-contained water remediation control unit; comprising:
    a generally rectangular structural housing dimensioned for ease of transportation from one location to another;
    a vessel mounted within said structural housing having a vertical baffle therein dividing the vessel into an inlet chamber and an outlet chamber, the baffle having means in a lower portion thereof for passage of water from the inlet chamber to the outlet chamber, the vessel having a water inlet communicating with the inlet chamber and an outlet communicating with the outlet chamber;
    an elongated vertical stripper column having a lower portion and a severable upper portion, the lower portion being received within said structural housing, the upper portion being removably attachable in vertical alignment with said lower portion, the upper portion being demountable for ease of transportation of said structural housing from one location to another, the upper portion having a water inlet connected to said vessel outlet chamber and the lower portion having a water outlet and the lower portion having an air inlet, the upper portion having an opening in its upper end thereof adaptable for receiving a removable exhaust tower thereon;
    packing positioned within said stripper column upper portion down through which water trickles; and
    air pump means mounted within said structural housing for forcing air into said stripper column bottom portion and upwardly through said packing to contact water passing downwardly through said packing to separate volatile contaminants from the water, which volatile components are carried out the upper end of said stripper column upper portion, clean water being drawn from said stripper tower lower portion.

2. A portable self-contained water remediation control unit according to claim 1 including:
    water pump means mounted within said structural housing for moving water from said vessel outlet chamber to said stripper column water inlet.

3. A portable self-contained water remediation control unit according to claim 2 including:
    a meter in series with said water pump means for registering volumes of water passing through said water remediation control unit.

4. A portable self-contained water remediation control unit according to claim 3 including:
    a discharge water pump means mounted within said structural housing and connected to said stripper column lower portion water outlet.

5. A portable self-contained water remediation control unit according to claim 4 including:
    an electrical meter means mounted within said structural housing and in electrical connection with said discharge water pump means for recording electrical consumption of said unit.

* * * * *